United States Patent [19]

Sullivan

[11] 4,268,052
[45] May 19, 1981

[54] MUD FLAP ASSEMBLY

[76] Inventor: James L. Sullivan, 15 Parkdale Dr., Farmingdale, N.Y. 11735

[21] Appl. No.: 107,737

[22] Filed: Dec. 27, 1979

[51] Int. Cl.³ .............................................. B62D 25/16
[52] U.S. Cl. ........................... 280/153 R; 280/154.5 R
[58] Field of Search ......... 280/153 R, 152 R, 154.5 R

[56] References Cited

U.S. PATENT DOCUMENTS

| 3,606,446 | 9/1971 | Leslie | 280/152 R |
| 3,953,053 | 4/1976 | Arenhold | 280/154.5 R |
| 4,012,053 | 3/1977 | Bode | 280/154.5 R |
| 4,174,850 | 11/1979 | Hart | 280/153 R |

Primary Examiner—Robert R. Song
Attorney, Agent, or Firm—Howard L. Rose

[57] ABSTRACT

A mud flap assembly for installation on an automobile without drilling holes or otherwise modifying the automobile body including a flap member, an L-shaped bracket mounted on a top outer corner of the flap member and having a hole therein for receiving a trim screw normally extending between lower and upper fenders of the automobile body, and a pair of clamps including straps extending around a brace extending between the automobile frame and the lower fender, the straps having ends secured to the ends of bolts mounted on the flap member.

6 Claims, 5 Drawing Figures

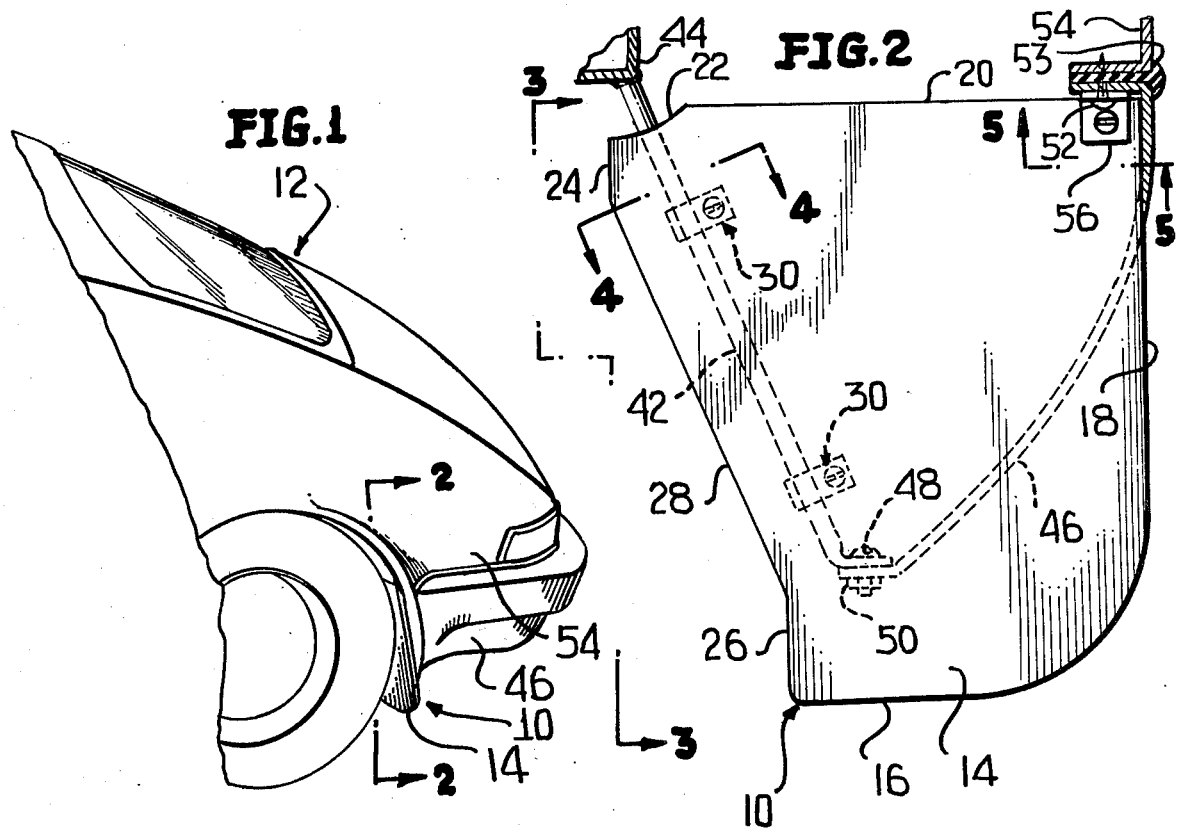
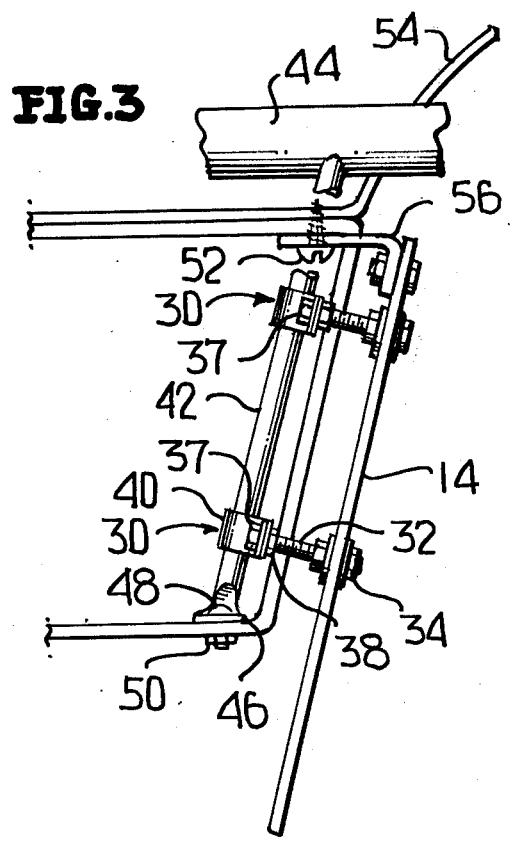
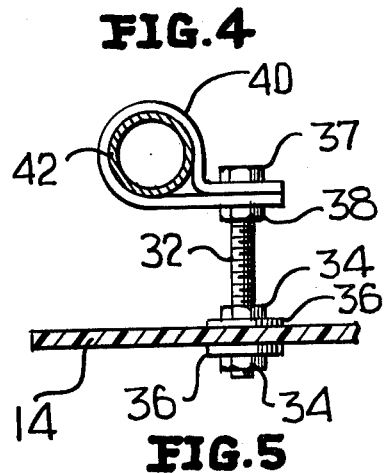
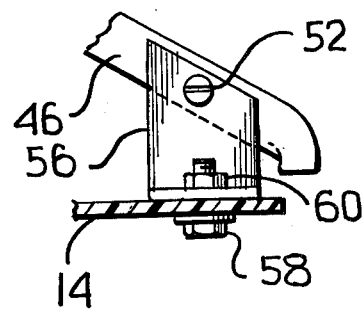

MUD FLAP ASSEMBLY

BACKGROUND OF THE INVENTION

1. Field of the Invention

The present invention pertains to mud flaps for automobiles and, more particularly, to a mud flap assembly for installation on an automobile without requiring drilling of holes or other modification of the automobile body.

2. Discussion of the Prior Art

Mud flaps are conventionally used on automobiles to prevent wheels from throwing rocks and other debris and are particularly desirable to prevent marring of the paint finish and/or damage to oil tanks and other components disposed beyond the rear wheels. Prior art mud flaps have had the disadvantages of requiring modification of the automobile body to mount the mud flap and/or of requiring the drilling of holes in the automobile body which produces a situation enhancing the prospect of rust in the body.

SUMMARY OF THE INVENTION

Accordingly, it is a primary object of the present invention to overcome the above mentioned disadvantages of the prior art by providing a mud flap assembly for an automobile that can be installed without drilling holes or otherwise modifying the automobile body.

Another object of the present invention is to utilize clamps gripping an existing brace and an existing trim screw on the body of an automobile to mount a mud flap assembly in a rear wheel well of the automobile.

Some of the advantages of the present invention over the prior art are that the mud flap assembly is simple in structure, inexpensive to produce and can be simply and inexpensively installed on an automobile with minimal labor and equipment requirements.

The present invention is generally characterized in a mud flap assembly for installation on an automobile having a trim screw extending through flanges of lower and upper fenders of the automobile body adjacent a wheel well and a brace extending between the automobile frame and the lower fender, the mud flap assembly including a flap member having an inner edge and a top outer corner, a bracket mounted on the flap member adjacent the top outer corner having a hole therein for receiving the trim screw to mount the flap member on the lower fender of the vehicle, and clamps mounted on the flap member adjacent the inner edge including a strap for extending around the brace of the automobile to mount the flap member thereon whereby the mud flap assembly can be installed on the automobile without drilling holes in the automobile body.

Other objects and advantages of the present invention will become apparent from the following description of the preferred embodiment taken in conjunction with the accompanying drawings.

BRIEF DESCRIPTION OF THE DRAWINGS

FIG. 1 is a broken perspective of an automobile having the mud flap assembly of the present invention installed thereon.

FIG. 2 is a section taken along line 2—2 of FIG. 1 showing a front elevation of the mud flap assembly of the present invention.

FIG. 3 is a section taken along line 3—3 of FIG. 2.

FIG. 4 is a section taken along line 4—4 of FIG. 2 showing a clamp of the mud flap assembly of the present invention.

FIG. 5 is a section taken along line 5—5 of FIG. 2 showing a bracket of the mud flap assembly of the present invention.

DESCRIPTION OF THE PREFERRED EMBODIMENT

A mud flap assembly 10 in accordance with the present invention for installation is shown in FIGS. 1 and 2 and includes a relatively flat, flap member made of rubber or other suitable material and having a bottom edge 16 curving into an outer side edge 18 which terminates at a top edge 20 defining a top outer corner. The top edge 20 joins, via a concavely curved corner edge 22, an inner side edge having parallel portions 24 and 26 joined by an angled portion 28.

The flap member 14 carries a pair of clamps 30 spaced along a line parallel to the angled side edge portion 28, each of the clamps 30 including a threaded bolt 32 having an end receiving a pair of nuts 34 and washers 36 sandwiching the flap member 14 therebetween and a head 37 cooperating with a nut 38 to sandwich the ends of a nylon strap 40, as best shown in FIG. 4. The strap 40 is adapted to extend around a tubular brace 42 secured at an upper end to the automobile frame 44 and at a lower end with the lower edge of a curved lower fender 46 of the automobile body by means of a bolt 48 and nut 50. Sheet metal trim screws 52 extend through inwardly extending flanges of the lower fender 46 and an upper fender 54 and through a trim strip 53 with only the screw adjacent the wheel well being shown. An L-shaped bracket 56 has a short leg mounted on the flap member 14 by means of a bolt 58 and a nut 60 and a long leg having an angled end with a hole 62 therein adapted to receive trim screw 52, as best shown in FIG. 5.

In use, the mud flap assembly can be installed on vehicle 10 by simply wrapping straps 40 of clamps 30 around brace 42 and securing the strap ends against bolt heads 37 via nuts 38. The sheet metal trim screw 52 adjacent the wheel well is thereafter removed and replaced through the hole 62 in the L-bracket 56 such that the flap member is held in place at the top outer corner thereof while the ends of bolts 32 are inserted through holes in the flap member for securement via nuts 36. In this manner, the mud flap assembly is installed in place on the automobile in a secure fashion without drilling any holes in the automobile body or otherwise modifying the structure of the automobile. With the mud flap assembly secured in place via the existing brace 42 and the existing sheet metal trim screw 52, the flap member 14 is precisely positioned in the wheel well behind a rear wheel to prevent rocks and other debris from being thrown against the body and chipping the paint finish and/or from hitting the oil tank which is often positioned behind the rear wheels.

Inasmuch as the present invention is subject to many variations, modifications and changes in detail, it is intended that all subject matter discussed above or shown in the accompanying drawing be interpreted as illustrative and not in a limiting sense.

Once given the above disclosure, many other features, modifications and improvements will become apparent to the skilled artisan. Such other modifications, features and improvements are, therefore, considered a part of this invention, the scope of which is to be determined by the following claims.

What is claimed is:

1. A mud flap assembly for installation on an automobile having a trim screw extending through flanges of lower and upper fenders of the automobile body adjacent a wheel well and a brace extending between the automobile frame and the lower fender, the mud flap assembly comprising a flap member having an inner edge and a top outer corner;

bracket means mounted on said flap member adjacent said top outer corner having a hole therein for receiving the trim screw to mount said flap member on the lower fender of the vehicle; and clamp means mounted on said flap member adjacent said inner edge including strap means for extending around the brace of the automobile to mount said flap member thereon whereby said mud flap assembly can be installed on the automobile without drilling holes in the automobile body.

2. A mud flap assembly as recited in claim 1 wherein said clamp means includes first and second spaced clamps arranged on said flap member along a line in parallel relation with the brace of the automobile, each of said clamps including a bolt mounted on said flap member and a strap for extending around the brace and having ends secured to said bolt.

3. A mud flap assembly as recited in claim 2 wherein each of said bolts is threaded and has a head and an end spaced from said head, and each of said clamps includes nuts threadedly engaging said bolt adjacent said head to secure said straps thereto and adjacent said bolt end to mount said flap member.

4. A mud flap assembly as recited in claim 3 wherein said bracket means includes an L-shaped bracket having a first leg bolted to said flap member and a second leg having said hole therein for receiving said trim screw.

5. A mud flap assembly as recited in claim 4 wherein said inner edge of said flap member has an angled edge portion arranged in parallel relation with said line along which said first and second clamps are arranged.

6. A mud flap assembly as recited in claim 1 wherein said bracket means includes an L-shaped bracket having a first leg bolted to said flap member and a second leg having said hole therein for receiving said trim screw.

* * * * *